(12) United States Patent
Tang et al.

(10) Patent No.: US 6,558,771 B1
(45) Date of Patent: May 6, 2003

(54) TEXTURED MAGNETIC MEDIA FOR USE WITH LOW-FLYING PADDED HEADS

(75) Inventors: Haun Tang, Cupertino, CA (US); Jing Gui, Fremont, CA (US); Samuel John Falcone, San Jose, CA (US); Michael Joseph Stirniman, San Jose, CA (US); Li-Ping Wang, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 194 days.

(21) Appl. No.: 09/597,168

(22) Filed: Jun. 20, 2000

Related U.S. Application Data

(60) Provisional application No. 60/151,090, filed on Aug. 27, 1999.

(51) Int. Cl.⁷ .................................................. G11B 5/82
(52) U.S. Cl. ..................... 428/141; 428/65.3; 428/65.4; 428/216; 428/694 TC; 428/694 TF; 428/694 TR; 428/694 SG; 360/135
(58) Field of Search ................................ 428/141, 65.3, 428/65.4, 216, 694 TC, 694 TF, 694 TR, 694 SG, 900; 360/135

(56) References Cited

U.S. PATENT DOCUMENTS

| | | | |
|---|---|---|---|
| 5,292,585 A | * | 3/1994 | Ohnuki et al. |
| 5,418,667 A | | 5/1995 | Best et al. |
| 5,626,941 A | | 5/1997 | Ouano |
| 5,714,207 A | | 2/1998 | Kuo |
| 5,768,076 A | | 6/1998 | Baumgart et al. |
| 5,796,551 A | | 8/1998 | Samuelson |
| 5,798,164 A | | 8/1998 | Weiss et al. |
| 5,858,536 A | * | 1/1999 | Yanagisawa |
| 5,945,197 A | | 8/1999 | Xuan et al. |
| 6,190,749 B1 | * | 2/2001 | Stirniman et al. ......... 428/64.1 |
| 6,205,002 B1 | * | 3/2001 | Baumgart et al. .......... 360/135 |
| 6,299,947 B1 | * | 10/2001 | Suzuki et al. ............... 427/555 |
| 6,381,090 B1 | * | 4/2002 | Suzuki et al. |

* cited by examiner

Primary Examiner—Stevan A. Resan
(74) Attorney, Agent, or Firm—McDermott, Will & Emery

(57) ABSTRACT

High areal recording density, magnetic hard disk recording media including CSS landing zones with laser-textured surfaces having shallow bump heights of from about 40 to about 80 Å, bump spacing in the circumferential and radial directions of from about 10 to about 30 $\mu$m, and bump diameter of from about 4 to about 8 $\mu$m, are provided for use in disk drive systems utilizing padded head sliders operating at very low head slider flying heights of about $0.7\mu$ inch or below.

10 Claims, 2 Drawing Sheets

TEXTURED MAGNETIC MEDIA FOR USE WITH LOW-FLYING PADDED HEADS

CROSS-REFERENCE TO PROVISIONAL APPLICATION

This application claims priority from U.S. provisional patent application Ser. No. 60/151,090 filed Aug. 27, 1999, the entire disclosure of which is incorporated herein by reference.

FIELD OF THE INVENTION

The present invention relates to high recording density, hard disk magnetic media for use with low-flying padded heads and systems therefor. More particularly, the present invention relates to hard disk magnetic media capable of use with padded heads operating at very low flying heights of less than about $0.7\mu$ inch, e.g., about $0.5\mu$ inch, and systems therefor. The invention has particular utility in computer-related applications.

BACKGROUND OF THE INVENTION

Hard disk-type magnetic media are widely utilized in various applications, particularly in the computer industry. A conventional longitudinal recording, hard magnetic disk-type medium 1 commonly employed in computer-related applications is schematically depicted in FIG. 1, and comprises a substantially rigid, non-magnetic metal substrate 10, typically of an aluminum (Al) alloy, such as an aluminum-magnesium (Al—Mg) alloy, having sequentially deposited thereon a plating layer 11, such as of amorphous nickel-phosphorus (Ni—P), a polycrystalline seed or underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC") formed, as is known, by sputtering of a carbon target in an appropriate atmosphere or by ion beam deposition ("IBD") utilizing appropriate precursor gases, and a lubricant topcoat layer 15, typically of a perfluoropolyether compound applied, as is known, by dipping, spraying, etc. The magnetic layer 13 typically comprised of a Co-based alloy may be formed by sputtering techniques and includes polycrystallites epitaxially grown on the polycrystalline Cr or Cr-based alloy underlayer 12.

In operation of medium 1, the magnetic layer 13 can be locally magnetized by a write transducer, or write "head", to record and thereby store information therein. The write transducer or head creates a highly concentrated magnetic field which alternates direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Thin film magnetic recording media are conventionally employed in hard disk form for use with disk drives for storing large amounts of data in magnetizable form. Typically, one or more disks are rotated about a central axis in combination with data transducer heads. In operation, a typical contact start/stop ("CSS") method commences when the transducer head, carried by an air-bearing slider, begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the surface of the disk. Thus, the transducer head contacts the disk surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

The air bearing design for the head slider/transducer utilized for CSS-type operation as described above provides an interface between the slider and the disk which prevents damage to the disk over the life of the disk/slider/transducer head system, and provides damping in the event the disk drive system undergoes mechanical shock due to vibrations of external origin. The air bearing also provides the desired spacing between the transducer and the disk surface. A bias force is applied to the slider by a flexure armature in a direction toward the disk surface. This bias force is counter-acted by lifting forces from the air bearing until an equilibrium state is achieved. The slider will contact the disk surface if the rotating speed of the disk is insufficient to cause the slider to "fly", as during start-up and shut-down phases of the CSS cycle. If the slider contacts a data region of the disk, the data may be lost and the disk permanently damaged.

Referring now to FIG. 2, shown therein in perspective view, is a conventionally configured magnetic hard disk 30 having a CSS (i.e., "landing") zone 36 and a data (i.e., recording) zone 40. More specifically, FIG. 2 illustrates an annularly-shaped magnetic hard disk 30 including an inner diameter 32 and an outer diameter 34. Adjacent to the inner diameter is an annularly-shaped, inner CSS or "landing" zone 36. When disk 30 is operated in conjunction with a magnetic transducer head (not shown in the drawing), the CSS or "landing" zone 36 is the region where the head makes contact with the disk surface during the above-described start-stop cycles or other intermittent occurrences. In FIG. 2, the radially outer edge of the CSS or "landing" zone 36 is indicated by line 38, which is the boundary between CSS zone 36 and data zone 40 where information in magnetic form is stored within the magnetic recording medium layer of disk 30.

It is generally considered desirable for reliably and predictably performing reading and recording operations, and essential for obtaining high areal density magnetic recording, that the transducer head be maintained as close to the disk surface as possible in order to minimize its flying height. Thus, a smooth disk surface is preferred, as well as a smooth opposing surface of the transducer head, thereby permitting the head and the disk to be positioned in very close proximity, with an attendant increase in predictability and consistent behavior of the air bearing supporting the transducer head during motion. However, if the head surface and the recording surface are too flat, the precision match of these surfaces gives rise to friction and "stiction", i.e., a combination of friction and "stickiness" (resulting from viscous shear forces) at the disk surface which causes the transducer head to adhere to the surface, particularly after periods of non-use, thereby making it more difficult for the transducer head to initiate movement therefrom. Excessive stiction and friction during the start-up and stopping phases of the above-described cyclic sequence causes wear of the transducer and disk surfaces, eventually leading to what is referred to as "head crash". Another drawback associated with smooth disk surfaces is lack of durability resulting from the very small amount of lubricant which is retained thereon. Thus, there are competing goals of minimizing transducer head flying height (as by the use of smooth surfaces) and reducing transducer head/disk friction (as by avoiding use of smooth surfaces).

Conventional practices for addressing these apparent competing objectives include providing at least the CSS or "landing" zone of the magnetic disk recording medium with a roughened surface to reduce transducer head/disk friction and stiction by a number of different techniques generally known as "texturing", such as disclosed in U.S. Pat. Nos. 5,626,941; 5,635,269; 5,714,207; 5,718,811; 5,768,076; 5,798,164; 5,945,197; and 6,020,045, the entire disclosures of which are incorporated herein by reference. Referring again to FIG. 1, suitable texturing techniques include, inter alia, circumferential polishing and localized laser heating of the surface of the disk substrate 10 (e.g., of Al—Mg alloy) to create thereon a texture pattern comprising a plurality of spaced apart projections ("bumps") prior to deposition thereon of a layer stack comprised of plating layer 12, polycrystalline seed or underlayer 12, magnetic layer 13, protective overcoat 14, and lubricant topcoat 15, wherein the textured surface of the underlying disk substrate 10 is substantially replicated in the subsequently deposited, overlying layers. According to such methodology, by providing a textured surface in at least the CSS or "landing" zone, the transducer head is able to rest and slide on the peaks of the projections or "bumps" during starting and stopping, thereby reducing the area of contact between the transducer head and the magnetic medium. As a consequence of the reduced area of contact in the CSS or "landing" zone, the amount of force necessary to initiate movement of the transducer head is considerably reduced. An additional advantage provided by the textured disk surface is the ability to retain a greater amount of lubricant, thereby further increasing disk durability by reducing friction and stiction.

A variety of possible configurations of the textured surface approach for reducing stiction and friction between the transducer head and the disk surface are possible, including texturing only the CSS or "landing" zone, wherein specular smoothness of the data zone is retained for permitting high bit density recording by allowing for very low head flying height; texturing the entire disk surface, i.e., the CSS and data zones, whereby friction and stiction reduction is provided in the data zone in addition to the CSS zone; and separately (i.e., differently) textured CSS and data zones, with and without a transition zone between the differently textured zones, wherein the texturing is optimized for each type of zone to maximize both recording characteristics and mechanical durability.

As previously indicated, in magnetic data/information recording, storage, and retrieval technology, it is continually desired to improve the areal density at which data/information can be recorded and reliably read. Because the recording density of a hard disk and its associated drive mechanism is limited by the distance between the transducer head and the surface of the magnetic medium, a goal of air bearing slider design for use in CSS operation, as described above, is to "fly" the slider as closely as possible to the medium surface while avoiding physical contact or impact with the medium. Smaller spacings, or "fly heights", are desired so that the transducer head can distinguish between the various magnetic fields emanating from closely spaced regions on the data zone of the disk surface.

The design of the CSS, or landing zone, of advanced, high areal recording density magnetic hard disk media for use with sliders operating at very low flying heights, i.e., $0.7\mu$ inch or less, poses a challenge because the conventional laser zone texturing ("LZT") technique appropriate for non-padded head sliders is fast approaching its technical limit in that further reduction in bump height to below about 130 Å, e.g., in order to provide lower flying heights of about $0.5\mu$ inch, will inevitably incur stiction failures due to onset of stiction "avalanche". Stated somewhat differently, stiction cannot be adequately controlled (i.e., moderated) for transducer head sliders operating at such low flying heights, unless relatively tall laser bumps, i.e., greater than about 130 Å, are employed. However, use of such tall bumps entails an increased likelihood of head-disk interference which can result in catastrophic head-disk failures, such as crashes.

A recent development in magnetic hard disk technology (see, for example, U.S. Pat. Nos. 5,418,667 and 5,796,551, and commonly assigned U.S. patent application Ser. No. 09/473,941, filed on Dec. 29, 1999, the entire disclosures of which are incorporated herein by reference) is formation of padded head sliders on the air bearing surface. Padded heads of this type include a plurality of slider pads coated with a wear-resistant material, such as DLC carbon, which face the disk surface during use. As illustrated in the schematic plan view of FIG. 3 showing the lower surface of slider 110, four, small, column-shaped landing pads 118 may be placed on the rails 120 of the flying head slider, proximate the corners thereof, to control stiction. The size and height of the pads 118 are selected such that the pads effectively reduce stiction during takeoff, yet provide sufficient clearance to prevent interference between the head and the disk during normal flying. For example, the total contact area of the four landing pads may be about 0.002–0.003 $mm^2$, and they may be about 300 Å high for providing stiction of about 2–3 gm. In contrast with the behavior exhibited with laser zone textured ("LZT") media, increased lubricant thickness when padded head sliders are utilized results in a controlled, i.e., linear, increase in stiction.

The DLC-coated slider pads are adapted to contact one or more of the DLC overcoat/lubricant topcoat-coated projections or bumps of the CSS or landing zone of the disk. The combination of DLC-coated slider pads and CSS bumps thus may offer the possibility of reducing stiction and friction during head slider takeoff and landing phases during operation of the disk drive and, as a consequence, provide an improvement in tribological performance.

The pad material of such padded head sliders is not limited to diamond-like carbon ("DLC"), but may, in some applications, comprise the same material as the contact, i.e., lower, surface of the slider, e.g., AlTiC. In addition, depressions or recesses may be formed in the rail surfaces to increase hydrodynamic lift and the number of pads is not restricted, as above, to four pads positioned adjacent the rail corners. For example, a large plurality of micro-pads may be formed extending along the length of the rails. The use of numerous micro-pads is advantageous in that improved reliability is provided, i.e., a single defective pad cannot cause a catastrophic failure. Moreover, the height of the pads may vary with position in order to further reduce fly stiction and dwell stiction, and the locations and/or spacings of the pads may be randomized. For example, pads located near the leading edge of the slider can have a greater height than pads located nearer the trailing edge. Other pad designs may compensate for reduced slider-disk separation with sliders having crown portions. Thus, the terms "padded head" or "padded slider" as utilized herein include all head or slider designs utilizing pads formed on the lower, sliding surface thereof for stiction control, regardless of their number, size, shape, location, and spacing.

There exists a need for improved, high bit or areal recording density, smooth-surfaced magnetic hard disk data/information recording, storage, and retrieval media and systems which are capable of use at very low head slider flying heights on the order of about $0.7\mu$ inch or less, such as about $0.5\mu$ inch, which media and systems exhibit low friction, stiction, and good tribological properties for minimizing head crashing. Moreover, there exists a need for improved, high areal recording density, hard disk media and systems which can be manufactured according to conventional methodologies and are fully mechanically compatible with conventional magnetic hard disk systems.

The present invention addresses and solves problems attendant upon the design and manufacture of high areal recording density magnetic hard disk media and systems utilizing head sliders operating at very low glide heights, while maintaining full compatibility with all mechanical aspects of conventional hard disk drive technology. Moreover, manufacture and implementation of the present invention can be obtained at a cost comparable to that of existing technology.

DISCLOSURE OF THE INVENTION

An advantage of the present invention is an improved, high areal recording density, magnetic hard disk recording medium suitable for use with a low-flying padded head slider at flying heights less than about $0.7\mu$ inch, e.g., about $0.5\mu$ inch.

Another advantage of the present invention is an improved, high areal recording density, magnetic hard disk recording medium suitable for use with low-flying padded head sliders and including a CSS landing zone having a laser-textured surface with shallow bumps having heights ranging from about 40 to about 80 Å.

Yet another advantage of the present invention is an improved, high areal recording density, magnetic hard disk recording system operable at very low padded head slider flying heights less than about $0.7\mu$ inch.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by a high areal recording density, magnetic hard disk recording medium suitable for use with a low-flying padded head slider at flying heights of about 0.7 $\mu$m or less, comprising an annularly-shaped disk having concentric, annularly-shaped data recording and CSS landing zones, wherein the surface of at least the CSS landing zone is textured, with a laser-formed texture having a shallow bump height of from about 40 to about 80 Å, bump spacing of from about 10 to about 30 $\mu$m circumferentially and from about 10 to about 30 $\mu$m radially, and bump diameter of from about 4 to about 8 $\mu$m.

According to particular embodiments of the present invention, the laser-formed textured surface of the CSS landing zone has a shallow bump height of from about 50 to about 80 Å, bump spacing of from about 10 to about 25 $\mu$m circumferentially and from about 10 to about 20 $\mu$m radially, and bump diameter of from about 4.5 to 5.0 $\mu$m; the medium comprises a substantially rigid, non-magnetic disk substrate, e.g., comprised of aluminum (Al) or an Al-based alloy, and includes a surface having a nickel-phosphorus (Ni—P) plating layer thereon; the medium further comprises (1) a polycrystalline seed or underlayer, e.g., of chromium (Cr) or a Cr-based alloy, on the Ni—P plating layer, (2) a high areal recording density magnetic layer, typically comprised of a cobalt (Co)-based alloy, on the polycrystalline underlayer, (3) a carbon (C)-containing protective overcoat layer on the magnetic layer, e.g., an about 20 to about 80 Å thick layer of sputtered, hydrogenated carbon or ion beam-deposited carbon, and (4) a lubricant topcoat layer on the protective overcoat layer, e.g., an about 15 to about 25 Å thick layer of a pre-fractionated perfluoropolyether polymer having an average molecular weight of about 2,000 and non-fluorinated alcohol end groups for facilitating adhesion to the protective overcoat layer.

According to another aspect of the present invention, a high areal recording density, magnetic hard disk-based recording system operable with low-flying padded head sliders at flying heights of about $0.7\mu$ inch or less, with robust CSS and fly stiction performance with minimized head-disk interference, comprises:

a magnetic read-write transducer including a padded head slider; and a high areal recording density, magnetic hard disk recording medium, comprising an annularly-shaped disk having concentric, annularly-shaped data recording and CSS landing zones, wherein the surface of at least the CSS landing zone is textured, with a laser-formed texture having a shallow bump height of from about 40 to about 80 Å, bump spacing of from about 10 to about 30 $\mu$m circumferentially and from about 10 to about 30 $\mu$m radially, and bump diameter of from about 4 to about 8 $\mu$m.

According to particular embodiments of the present invention, the laser-formed textured surface of the CSS landing zone has a bump height of from about 50 to about 80 Å, bump spacing of from about 10 to about 25 $\mu$m circumferentially and from about 10 to about 20 $\mu$m radially and bump diameter of from about 4.5 to about 5.0 $\mu$m; the padded head slider comprises at least four landing pads comprised of a wear-resistant material, e.g., of diamond-like carbon ("DLC") or AlTiC, located proximate the corners of the head slider on a lower surface thereof facing the magnetic hard disk recording medium, each of the four landing pads having a height of about 300 Å and providing a total contact area with the CSS landing zone of from about 0.002 to about 0.003 mm$^2$; the high areal recording density magnetic hard disk recording medium comprises (1) a substantially rigid, non-magnetic disk substrate comprised of aluminum (Al) or an Al-based alloy with a surface having a nickel-phosphorus (Ni—P) plating layer thereon, (2) a polycrystalline chromium (Cr) or Cr-based alloy seed or underlayer on the Ni—P plating layer, (3) a high areal recording density cobalt (Co)-based magnetic layer on the polycrystalline seed or underlayer, (4) a carbon (C)-containing protective overcoat layer on the magnetic layer, and (5) a lubricant topcoat layer on the protective overcoat layer; wherein the C-containing protective overcoat layer is from about 20 to about 80 Å thick and comprises sputtered, hydrogenated carbon or ion beam-deposited carbon; and the lubricant topcoat layer is from about 15 to about 25 Å thick and comprises a pre-fractionated perfluoropolyether polymer having an average molecular weight of about 2,000 and non-fluorinated alcohol end groups for facilitating adhesion to the protective overcoat layer.

According to yet another aspect of the present invention, a high areal recording density, magnetic hard disk-based recording system comprises:

a high areal recording density, magnetic hard disk recording medium having a smooth surface; and padded head slider means for operating at a low flying height of about $0.7\mu$ inch or less above the smooth surface of the magnetic hard disk recording medium.

According to embodiments of the present invention, the high areal recording density magnetic disk recording medium comprises a CSS landing zone including a surface texture with a laser-formed texture having a shallow bump height of from about 40 to about 80 Å, bump spacing of from about 10 to about 30 $\mu$m circumferentially and from about 10 to about 30 $\mu$m radially, and bump diameter of from about 4 to about 8 $\mu$m; and the padded head slider means includes on a surface thereof facing the CSS landing zone a plurality of landing pads comprised of a wear-resistant material.

Additional advantages and aspects of the present invention will become readily apparent to those skilled in the art from the following detailed description, wherein embodiments of the present invention are shown and described, simply by way of illustration of the best mode contemplated for practicing the invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiment of the present invention can best be understood when read in conjunction with the following drawings, wherein.

DESCRIPTION OF THE INVENTION

The present invention addresses and solves problems associated with the development of very high areal density magnetic disk recording media requiring very low flying heights of the read/write transducer head, such as are desired to be utilized in electronic computers and other type devices requiring very high recording densities. The present invention is based upon recognition that magnetic disk recording media having CSS landing zones with shallow bump height laser-textured surfaces can be advantageously utilized with padded head sliders operating at very low flying heights on the order of about $0.7\mu$ inch or less, e.g., as low as about $0.5\mu$ inch, to provide very high areal, or bit, recording densities while exhibiting robust CSS tribological and fly stiction performance with minimal head-disk interference.

Figure 1:
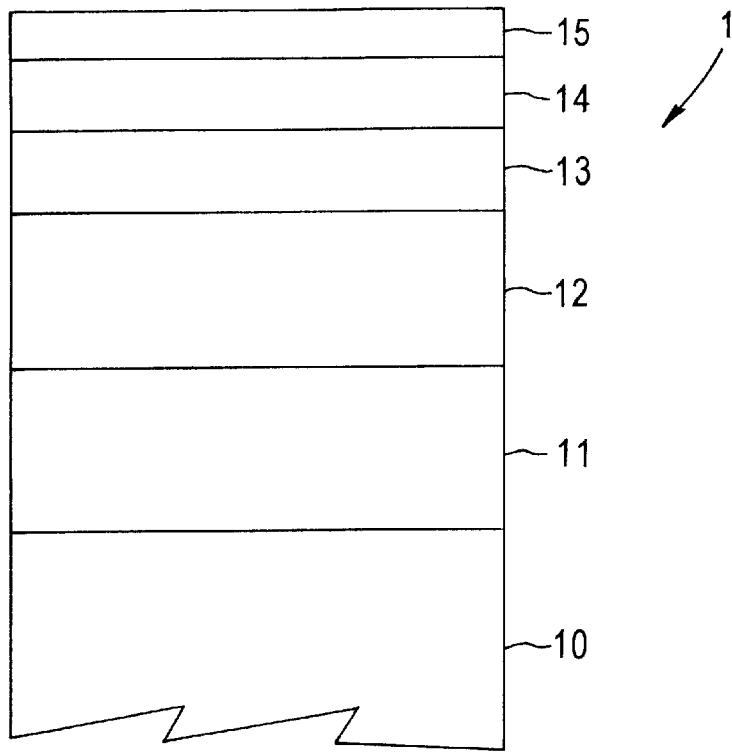
FIG. 1 schematically illustrates, in cross-sectional view, a portion of a conventional longitudinal-type magnetic disk recording medium.
Figure 2:
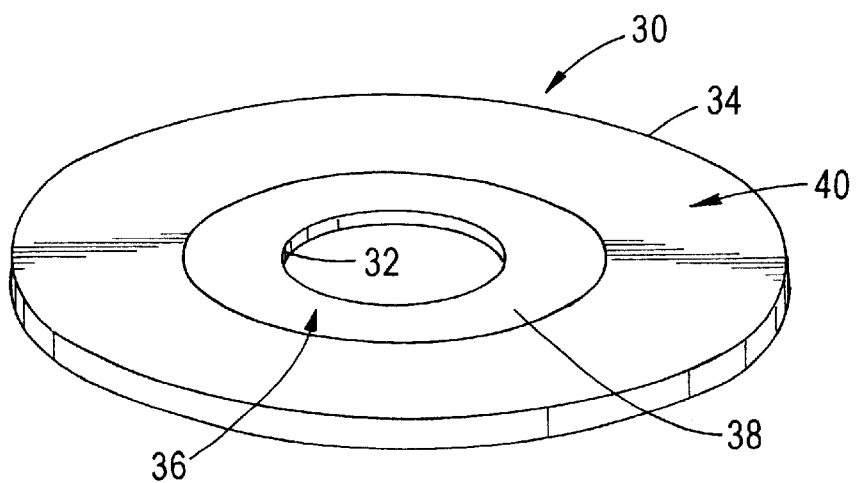
FIG. 2 is a perspective view of a magnetic disk of the type shown in FIG. 1, for illustrating the CSS landing and data recording zones thereof.

High areal recording density, magnetic hard disk media of the type and configuration shown and described above with reference to FIGS. 1 and 2, when fabricated according to the principles of the present invention, include the following design features:

(1) at least the CSS landing zone is provided with a shallow bump height, laser textured surface. As defined herein, the expression "shallow bump height, laser textured surface" signifies a surface texture having shallow bump heights of from about 40 to about 80 Å, bump spacings of from about 10 to about 30 $\mu$m in the circumferential direction and from about 10 to about 30 $\mu$m in the radial direction, and bump diameters of from about 4 to about 8 $\mu$m. Thus, bump patterns contemplated for use in the CSS landing zone of magnetic hard disk media according to the present invention include square- and rectangular-shaped "unit-cell" patterns, as well as radially outwardly extending rows or lines of bumps forming spoke-shaped patterns. Typically, such surface textures are obtained by laser techniques as disclosed in, for example, U.S. Pat. Nos. 5,062,021; 5,635,269; 5,714,207; 5,768,076; and 5,945,197, the entire disclosures of which are incorporated herein by reference. The surface texture of the substrate or initially textured layer formed thereon, such as an amorphous, hard Ni—P plating layer (11 in FIG. 1), is substantially replicated by each of the previously described polycrystalline, magnetic, protective overcoat, and lubricant topcoat layers (12–15) which are successively deposited thereover to form a layer stack as shown in FIG. 1. The entire surface of the Ni—P plating layer may be subjected to laser texturing or, if desired, only the CSS landing zone may receive shallow bump height laser texturing according to the invention. Thus, with reference to FIG. 2, both the CSS landing zone 36 and the data recording zone 40 of magnetic hard disk media fabricated according to the principles of the present invention may receive shallow bump height laser texturing or the data recording zone 40 may be non-textured, i.e., smooth surfaced with a low average surface roughness $R_a$, e.g., about 10 Å or less;

(2) from about 20 to about 80 Å of a wear-resistant protective overcoat layer over the magnetic recording layer, e.g., comprised of a carbon-containing material such as sputtered amorphous hydrogenated carbon (a-C:H) or optimized ion beam-deposited ("IBD") carbon; and (3) from about 15 to about 25 Å of a perfluoropolyether polymer lubricant topcoat layer on the protective overcoat layer. Preferably, the perfluoropolyether material is pre-fractionated to a desired approximate range of molecular weights, e.g., approximately 2000, and comprises end or terminal groups which facilitate adhesion of the lubricant to the underlying protective overcoat layer, such as alcohol groups (R—OH). The lubricant topcoat may, if desired, be applied in stages, e.g., by successive dipping into a lubricant-containing fluid, and may receive a post-deposition treatment for effecting cross-linking for further improvement in adhesion and lubricant properties.

High areal recording density, magnetic hard disk-based recording systems, when fabricated according to the principles of the present invention, include the combination of the improved, high areal recording density, magnetic hard disk recording medium including the shallow bump height, laser-textured CSS landing zone as described above, and a very low flying height magnetic read-write transducer head, such as any one of the padded head sliders described above. By way of illustration, but not limitation, a suitable padded head slider design is as shown and described above with respect to FIG. 3. For example, a padded head slider suitable for use with magnetic hard disk media including a CSS landing zone incorporating the design features described above, comprises four or more wear-resistant landing pads comprised of, for example, diamond-like carbon ("DLC") or AlTiC, disposed proximate the four corners of the lower surface of a head slider adapted to face the magnetic disk recording medium, wherein each of the four landing pads has a height above the slider lower surface of about 300 Å and providing a total contact area with the CSS landing zone surface of from about 0.002 to about 0.003 mm$^2$.

EXAMPLES

High areal recording density, magnetic hard disk recording media were fabricated with CSS landing zones having shallow bump height, laser-textured surfaces incorporating the principles of the present invention as described above, wherein:

| | |
|---|---|
| bump height: | 50 Å |
| bump spacing: | 23 $\mu$m circumferentially; 17 $\mu$m radially |
| bump diameter: | ~5 $\mu$m |
| protective overcoat: | 75 Å thick a-C:H |
| lubricant topcoat: | 20 Å Z-Tetraol (Ausimont Co., Thorofare, NJ), pre-fractionated to an average molecular weight of about 2,000 |

Figure 3:
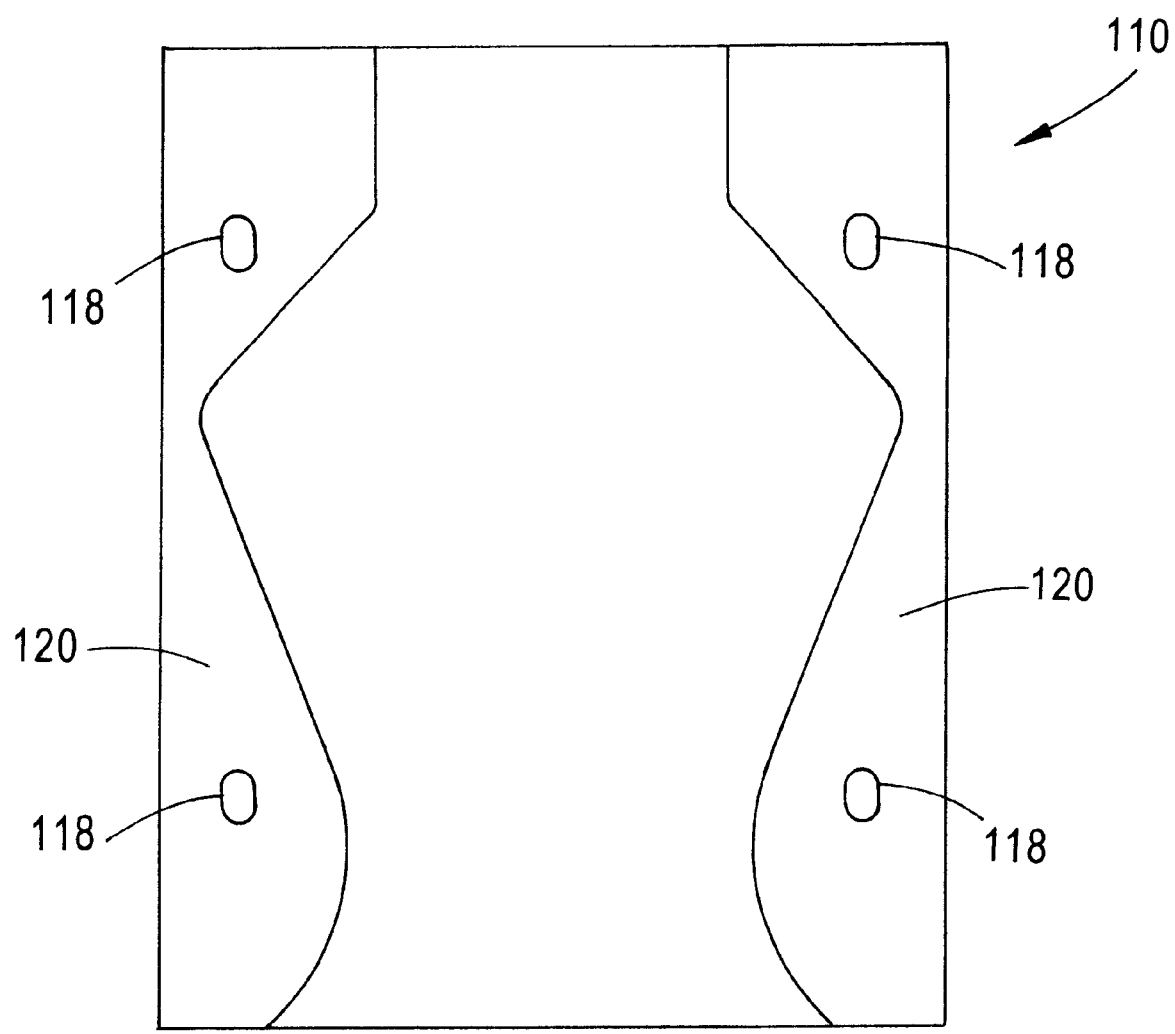
FIG. 3 schematically illustrates, in plan view, the lower surface of an exemplary padded head slider for use in the present invention.

10,000 CSS (Contact Start/Stop) cycles were performed with each of the magnetic hard disk mediums fabricated as above, utilizing a padded head slider generally similar to that illustrated in FIG. 3 ("Cheetah" 18LP W3), operating at very low flying heights of from about 0.5 to about 0.7$\mu$ inch, in ambient and elevated temperature environments (i.e., 75° C. and 5% relative humidity). Robust tribological and CSS performance was exhibited, along with good fly stiction and minimal head-disk interference. Specifically, low stiction was obtained, i.e., being about 3.5 gms. in the ambient atmosphere and from about 2 to about 2.7 gms. at the elevated temperature. Friction was correspondingly low, i.e., less than about 2 gms. in the ambient atmosphere and about 1.5 gms. at elevated temperature. Pad wear was also low, being about 20 Å in the ambient atmosphere and from about 25 to 37.5 Å at the elevated temperature. Similarly fabricated media where, however, the bump height was 70 Å and the bump spacing was 18 $\mu$m circumferentially and 12 $\mu$m radially, also exhibited low fly stiction, ranging from less than about 2 to about 4 gms.

As described above, conventional laser texturing techniques may be employed for fabricating the low bump height, textured surface CSS landing zone magnetic hard disk media contemplated by the present invention. Similarly, in the event the data recording zone of the magnetic media is desired to be smooth, conventional mechanical polishing techniques may be utilized for providing surfaces having a desired low average surface roughness $R_a$. Moreover, each of the various layers comprising the layer stack or laminate constituting the magnetic recording medium can also be formed by techniques and methodologies conventionally employed in the manufacture of magnetic recording media, including, inter alia, electroless plating, cathode sputtering, ion beam deposition, and lubricant coating, as by dipping.

Thus, the present invention advantageously provides, as by conventional processing techniques and methodologies, high areal recording density magnetic recording media and systems therefor including shallow bump height, laser-textured CSS landing zones, capable of operating with padded head sliders at very low flying heights of 0.7$\mu$ inch or less.

In the previous description, numerous specific details are set forth, such as specific materials, structures, processes, etc., in order to provide a better understanding of the present invention. However, the present invention can be practiced without resorting to the details specifically set forth. In other instances, well-known processing techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concepts as expressed herein.

What is claimed is:

1. A magnetic hard disk recording medium suitable for use with a low-flying padded head slider at flying heights of about 0.7$\mu$ inch or less, comprising an annularly-shaped disk having concentric, annularly-shaped data recording and CSS landing zones, wherein the surfaces of said data recording and CSS landing zones are textured, with a laser-formed texture having a shallow bump height of from about 40 to about 80 Å, bump spacing of from about 10 to about 30 $\mu$m circumferentially and from about 10 to about 30 $\mu$m radially, and bump diameter of from about 4 to about 8 $\mu$m.

2. The magnetic hard disk medium as in claim 1, wherein the laser-formed textured surface of said CSS landing zone has a shallow bump height of from about 50 to about 80 Å, bump spacing of from about 10 to about 25 $\mu$m circumferentially and from about 10 to about 20 $\mu$m radially, and bump diameter of from about 4.5 to about 5.0 $\mu$m.

3. The magnetic hard disk medium as in claim 1, wherein said medium comprises a substantially rigid, non-magnetic disk substrate.

4. The magnetic hard disk medium as in claim 3, wherein said non-magnetic disk substrate comprises aluminum (Al) or an Al-based alloy, and includes a surface having a nickel-phosphorus (Ni—P) plating layer thereon.

5. The magnetic recording medium as in claim 4, further comprising a polycrystalline seed or underlayer on said Ni—P plating layer, a high areal recording density magnetic layer on said polycrystalline underlayer, a carbon (C)-containing protective overcoat layer on said magnetic layer; and a lubricant topcoat layer on said protective overcoat layer.

6. The magnetic recording medium as in claim 5, wherein said polycrystalline seed or underlayer comprises chromium (Cr) or a Cr-based alloy and said magnetic layer comprises a cobalt (Co)-based alloy.

7. The magnetic recording medium as in claim 5, wherein said carbon-containing protective overcoat layer is from about 20 to about 80 Å thick and comprises sputtered, hydrogenated carbon or ion beam-deposited carbon.

8. The magnetic recording medium as in claim 5, wherein said lubricant topcoat layer is from about 15 to about 25 Å thick and comprises a pre-fractionated perfluoropolyether polymer.

9. The magnetic recording medium as in claim 8, wherein said perfluoropolyether polymer is pre-fractionated to have an average molecular weight of about 2,000.

10. The magnetic recording medium as in claim 9, wherein said perfluoropolyether polymer comprises non-fluorinated alcohol end groups for facilitating adhesion to said protective overcoat layer.

* * * * *

UNITED STATES PATENT AND TRADEMARK OFFICE
CERTIFICATE OF CORRECTION

PATENT NO.   : 6,558,771 B1
DATED        : May 6, 2003
INVENTOR(S)  : Huan Tang et al.

It is certified that error appears in the above-identified patent and that said Letters Patent is hereby corrected as shown below:

Title page,
Item [75], Inventors, change "Haun Tang" to -- Huan Tang --.

Signed and Sealed this

Third Day of January, 2006

JON W. DUDAS
*Director of the United States Patent and Trademark Office*